United States Patent

Smith et al.

[15] 3,701,979

[45] Oct. 31, 1972

[54] SLOW WRITE-FAST READ MEMORY METHOD AND SYSTEM

[72] Inventors: Donald O. Smith, Lexington; Kenneth J. Harte, Carlisle; Mitchell S. Cohen, Watertown, all of Mass.

[73] Assignee: Micro-Bit Corporation, Burlington, Mass.

[22] Filed: Jan. 9, 1970

[21] Appl. No.: 1,755

[52] U.S. Cl. .........340/173 R, 307/238, 340/173 LS, 340/173 CR

[51] Int. Cl. .........................G11c 11/42, G11c 11/34

[58] Field of Search.....340/173 CR, 173 PP, 173 SP, 340/173 LS; 307/238

[56] References Cited

UNITED STATES PATENTS 2,901,662 8/1959 Nozick ......................340/173

OTHER PUBLICATIONS

IBM Tech. Dis. Bul., Vol. 9, No. 5, Oct. 1966, " Charge- Storage Beam Addressed Memory," W. R. Beam, pp. 555- 556.

*Primary Examiner*—Terrell W. Fears
*Attorney*—Charles W. Helzer

[57] ABSTRACT

A slow write-fast read out information storage and retrieval method and system is described for use as a computer memory. The method and system employs a memory element comprising a conductive back layer, a semiconductor layer and an insulator enriched with an additive polarizing material such as the alkali metals sodium or lithium and a conductive front layer arranged in the order named in the form of a sandwich with the semiconductor layer and polarizing material enriched insulator layer forming an interface. By selectively heating discrete different locations on the memory element with a directed electron beam in accordance with the intelligence to be recorded, and applying a polarizing electric potential across the memory element which maintains the insulator layer positive with respect to the semiconductor layer concurrently with the selective heating, positive electric charges (which are non-destructive during read-out) will be formed in the insulator layer due to mobile ions of the additive alkali metal polarizing material which are transported to the interface as a result of the polarizing potential. The positive electric charges in turn produce space charge regions in the semiconductor layer adjacent to the interface at the selectively heated different discrete locations. If the semiconductor layer is a p-type semiconductor, the space charge region is a depletion region. If the semiconductor layer is a n-type semiconductor, the space charge region will be an accumulation region. By subsequently allowing the insulator layer to cool, the mobile ion charges thus transported to the interface at the selectively heated locations will be frozen in to thereby form selectively located, semi-permanent, space charge regions in the semiconductor layer whereby the intelligence to be recorded is embodied in the selectively located charges. In a subsequent reading operation, a read-out electron beam is caused to penetrate through the insulator layer and interface to the space charge region of the semiconductor layer where it will produce electron-hole carriers in the space charge region. To facilitate the reading operation, a polarizing, reading potential may be applied across the memory element simultaneously with the read-out electron beam. In the selectively located space charge regions, a considerably increased electron-hole pair current will be produced compared to that normally induced by the electron beam itself in those regions which have not been selectively polarized. Consequently a pulsed current output can be derived during the reading operation which is indicative of the data or intelligence stored in the memory element.

31 Claims, 14 Drawing Figures

United States Patent
Smith et al.
[15] 3,701,979
[45] Oct. 31, 1972
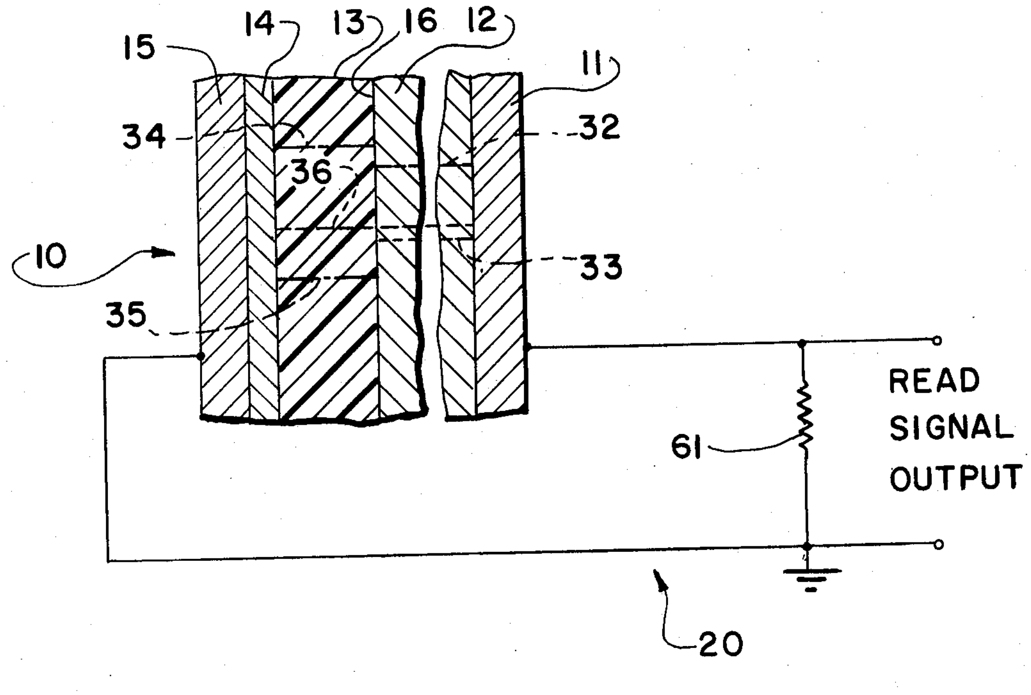

INVENTORS
DONALD O. SMITH
KENNETH J. HARTE
MITCHELL S. COHEN

BY *Charles W. Helzer*
ATTORNEY

INVENTORS
DONALD O. SMITH
KENNETH J. HARTE
MITCHELL S. COHEN

BY Charles W. Helzer
ATTORNEY

INVENTORS
DONALD O. SMITH
KENNETH J. HARTE
MITCHELL S. COHEN
BY Charles W. Helzer
ATTORNEY

INVENTORS
DONALD O. SMITH
KENNETH J. HARTE
MITCHELL S. COHEN

BY Charles W. Helzer
ATTORNEY

SLOW WRITE-FAST READ MEMORY METHOD AND SYSTEM

BACKGROUND OF INVENTION

1. Field Of Invention

This invention relates to a new and improved slow write-fast read-out information storage and retrieval method, system and element for use as the memory of a high speed computer system.

More particularly, the invention relates to a memory method and system employing an electrically chargeable, polarizing material enriched insulator-semiconductor memory element for permanently recording data in the form of selectively placed, different discrete electric charges which subsequently can be read out non-destructively at minimum access times with an electron beam read-out apparatus. The method, system and memory element while requiring relatively long recording times on the order of 1 millisecond ($10^{-3}$ seconds), makes available high speed, random access, non-destructive read-out retrieval times on the order of a microsecond ($10^{-6}$ seconds), or less and is ideally suited for use as a high speed computer system memory which requires updating on only an occasional basis but is to be read-out regularly with minimum access times.

2. Prior Art Problem

The provision of high speed memories having minimal access times for use as the central or main memory of large computer systems, is a continuing problem to which many investigators are directing their efforts. A number of investigators have shown that electric charges can be stored in the insulator layer of a properly biased capacitor subjected to penetrating ionizing radiations such as x-rays or electrons. Further more, it has been demonstrated that the stored electric charges thus formed influence the semiconductor carrier density in an immediately adjacent space charge region of a semiconductor layer forming an interface with such a selectively charged insulator layer. Depending upon the semiconductor type and doping level, an accumulation or depletion region can be formed in the semiconductor layer adjacent the interface. Recently, it has been shown that the state of the stored charges thus selectively formed in such an insulator layer can be detected by probing the semiconductor space charge region with a penetrating electron beam, and noting the efficiency of separation of the electron-hole pairs which are generated within such region by the probing electron beam. In such an arrangement, an electron beam is directed normal to the surface of a metal-insulator-semiconductor-metal sandwich having a polarizing potential which maintains the insulator either positive or negative with respect to the semiconductor applied there across, in order to perform a writing operation in which data or information is stored in the sandwich or memory element thus comprised. The electron beam penetrates the metal film into the oxide insulator, elevating to the conduction band electrons from the valence band and/or from traps in the band gap of the oxide. If the polarizing potential is positive, the electrons are swept from the oxide by the applied polarizing electric field leaving positive charge centers in the oxide insulator adjacent to the interface between the insulator layer and the semiconductor layer. The position of the stored charge, as well as its magnitude, is determined by the magnitude and polarity of the voltage applied during the electron bombardment. With a negative voltage applied across the sandwich having a polarity such that the semiconductor is maintained positive relative to the insulator, positive charge will be removed (erased) from the oxide insulator near the insulator-semiconductor interface. By proper selection of the insulator layer and semiconductor layer, either a charged condition or a non-charged condition can be maintained indefinitely. Thus, by the selective placement of charged locations and non-charged locations in the insulator layer, data or information can be recorded in the memory element. The area of electric charge storage is roughly proportional to the cross sectional area of the scanning electron beam employed to selectively place the electric charges in the insulator layer.

If the semiconductor layer is formed from a p-type semiconductor the presence of positive charges near the insulator-semiconductor interface tends to make the energy bands of the semiconductor layer bend down at the interface, thus causing the creation of, or enhancing an existing depletion region in the semiconductor near the insulator-semiconductor interface. If the semiconductor is formed from n-type semiconductor, the presence of positive charges near the insulator-semiconductor interface again tends to make the energy bands of the semiconductor layer bend down at the interface, but tends to destroy any existing depletion region, and to create an accumulation region in the semiconductor. For either n- or p-type semiconductor materials, the absence of positive charge near the insulator-semiconductor interface (such as occurs where a location does not have the electron beam impinge upon it or alternatively the sandwich is polarized with an applied potential which maintains the insulator negative with respect to the semiconductor layer) results in no influence on the semiconductor layer. Thus, it will be appreciated that in those locations where electric charges previously have been stored, it is possible to erase such charges and thereby update data or information stored in the memory element concurrently with impingement of the electron beam on the insulator layer.

During a read-out operation, the memory element sandwich is interrogated with a scanning electron beam in order to detect the information stored in the charges formed in the insulator layer previously during a writing operation at different discrete locations on the surface of the memory element. The electron beam is directed to the same point at which charges previously may have been stored in the insulator layer, and the penetrating power of the electron beam is increased sufficiently so that the electron beam impinges into the space charge region (depletion or accumulation region depending upon the semiconductor type) of the semiconductor layer. To facilitate the read-out operation, concurrently with the probing of the electron beam, a read-out polarizing potential maybe applied across the memory element sandwich. For p-type semiconductors, this read-out polarizing potential maybe positive in polarity (insulator layer positive with respect to the semiconductor layer) and for n-type semiconductors the polarizing potential is negative in polarity (insulator negative with respect to semiconductor layer). Under these conditions, if the semiconductor layer is p-type, and the stored charge in the insulator layer causes a significant depletion region in the semiconductor layer adjacent the interface, electron-hole carriers are created by the probing electron beam, and are swept in opposite directions from the depletion region by the built-in electric field associated with the depletion region, and additionally by the reading polarizing potential where such is used, thus giving rise to an externally measurable current pulse. This current pulse (denoted $I_s$) can be detected by any suitable external utilization circuit such as a detector, computer or the like coupled to the memory element sandwich, so that by monitoring the pulsed output current, the charged or non-charged state of different discrete locations on the surface of the memory element sandwich can be discerned. Hence, data or information recorded by the existence of charged or non-charged locations, can be retrieved. Besides the described electron-hole current pulse, an electron beam induced insulator current pulse $I_i$ also is induced and can be measured during read-out along with the electron-hole carrier current pulses. The beam-induced current pulses $I_i$ originate in the separate of electrons and holes generated in the insulator layer during read-out and swept out by the external applied reading polarizing field, and readily can be differentiated because of their lower magnitude from the electron-hole semiconductor carrier current pulses $I_s$ which are several orders of magnitude greater in amplitude.

With the above briefly described metal-insulator-semiconductor-metal memory element system, it is experimentally observed that the reading electron beam used to read-out the state of stored electric charges may also tend to alter the charge state so that the read-out process is destructive. It is the purpose of this disclosure to describe a charge-storage-read-out method, system, and metal-polarizing material enriched insulator-semiconductor-metal memory element which can be read-out non-destructively by an electron beam.

SUMMARY OF INVENTION

It is therefore a primary object of the present invention to provide a new and improved relatively slow write-fast read-out information storage and retrieval method, system and element for use as part of the memory system of high speed computers and the like.

Another object of the invention is to provide such a memory method and system employing an electrically chargeable, metal-polarizing material enriched insulator-semiconductor-metal memory elements for permanently recording data in the form of selectively placed, different discrete electric charges which subsequently can be read-out non-destructively at high speeds with a directed electron beam read-out apparatus. The new and improved memory method, system and element while requiring relatively long recording times on the order of one millisecond makes available high speed, random access non-destructive read-out retrieval times on the order of a microsecond or less, and is ideally suited for use as a high speed computer system memory which requires only occassional updating but is to be read-out regularly in minimum access times.

In practicing the invention, a slow write-fast read-out information storage and retrieval method and system are provided which employ a memory element comprising a conducting back layer, a semiconductor layer, an insulator enriched with an additive polarizing material such as the alkali metals sodium or lithium and a conductive front layer arranged in the order named in the form of a sandwich with the semiconductor layer and the polarizing material enriched insulator layer forming an interface. The method and system utilizing such elements selectively heats (through the medium of a directed electron beam) different discrete locations on the memory element in accordance with data or intelligence to be recorded. Concurrently a polarizing writing potential is applied across the memory element which polarizes the insulator layer positive with respect to the semiconductor layer and results in the formation of positive electric charges due to mobile ions of the additive polarizing alkali metal material in the insulator layer adjacent the interface. This in turn results in the formation of enhanced space charge regions in the semiconductor layer adjacent the interface at the selectively heated different discrete locations. Subsequently, upon cooling the selectively heated different discrete locations to ambient temperature while maintaining the polarizing potential, the electric charges are frozen into the insulator layer and result in permanently holding the selectively located enhanced space charge region in the semiconductor layer adjacent the interface to thereby permanently record the data or intelligence to be stored. By switching the polarity of the polarizing potential across the memory element to the opposite polarity and concurrently selectively heating the different discrete locations on the memory element where positive ions previously have been recorded at the insulator-semiconductor interface, the ions can be removed from this interface and returned to the interface between the insulator and the top metal layer so that upon subsequent cooling to ambient temperature while maintaining the de-polarizing potential, the positive electric charges at the insulator-semiconductor interface previously formed can be erased. In this manner information may be written, erased, written again, erased, etc an indefinite number of times at any given discrete location on the surface of the memory element to allow for updating of data or information recorded on the element. When the movable positive ions are located at the insulator-metal interface the semiconductor is free of space charge since the high electronic conductivity of the metal results in charge compensation over very short distances. Consequently, this state of the device will be referred to as the "uncharged state."

During read-out, electron beam current is reduced in order to avoid heating the memory element and penetrates through the insulator layer and interface of the adjacent space charge region of the semiconductor layer. By detecting the difference in the resulting electron-hole carrier current from the different discrete locations on the memory element as they are probed by the directed read-out electron beam, data previously recorded on the memory element can be recovered.

In preferred embodiments of the invention, the insulating layer of the memory element is selected from the class of materials through which ions can readily move. Preferred examples are $SiO_2$ and SiO. Conversely, the additive polarizing material should provide ions which move easily through the insulator. Preferred additive polarizing materials are the alkali metals selected from the group consisting of sodium and lithium. Alternatively hydrogen ions may be used.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGS. 10*a* and 10*b* are characteristic current versus time electric signal wave shapes which would be produced in reading out the charge pattern stored in the memory element shown in FIG. 9 where the directed electron beam sequentially travels from the top of FIG. 9 to the bottom of the figure, and wherein FIG. 10*a* depicts the wave shape for a memory element employing a p-type semiconductor layer, and FIG. 10*b* represents the wave shape that would be produced for a memory element employing a n-type semiconductor layer;

DETAILED DESCRIPTION OF PREFERRED EMBODIMENTS

In order to disclose the improved method system and memory element for information recording and retrieval in accordance with the invention, FIGS. 1–5 and 8 are provided to illustrate the nature of the memory element in the various conditions which it assumes prior to writing, during the writing (recording) process, subsequent to writing while preserving the information, during the reading process and both during and subsequent to the erase process which by definition corresponds to writing a binary "0."

Figure 1:
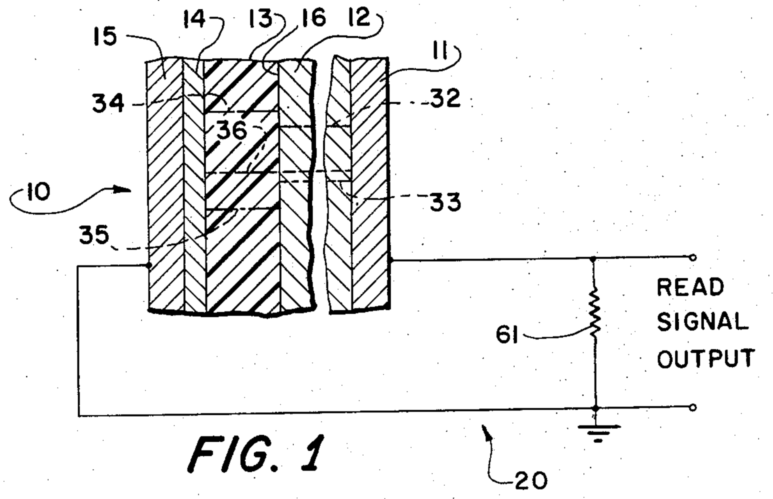
FIG. 1 is a fragmentary sectional view of a memory element constructed in accordance with the invention and illustrates the same in its normal quiescent uncharged condition.

FIG. 1 of the drawings is a partial fragmentary sectional view of a memory element sandwich 10 fabricated in accordance with the invention, and shows the memory element 10 in its natural, quiescent condition prior to any electric charge being stored therein in accordance with the invention. It is to be understood that the fragmentary section shown in FIG. 1 comprises only a part of a complete memory element fabricated in accordance with the invention. A complete memory element would comprise a wafer-like (sandwich), planar recording medium which is essentially square in configuration and considerably larger in size than that depicted in FIG. 1. For comparison purposes, the fragmentary section 10 shown in FIG. 1 may comprise an elemental part of an overall memory element sandwich that is about .25 mm thick and 8 mm by 8 mm square. The elemental part 10 of the memory element sandwich or wafer shown in FIGS. 1–5 and 8 is on the order of a few microns in dimension measured along the vertical axis of the page and corresponds to one or two diameters of a finely focused electron beam.

The memory element sandwich shown in FIG. 1 is comprised by a conductive back layer 11, a semiconductor layer 12, an insulator layer 13 having a layer of additive polarizing material 14 formed thereon and a conductive front layer 15 all arranged in the order named in the form of a sandwich with the semiconductor layer 12 and insulator layer 13 forming an interface 16.

A variety of semiconductor and insulator materials can be employed in fabricating the memory element sandwich shown in FIG. 1. Semiconductors that suitably could be employed in fabricating the memory element sandwich comprise Si, Ge, InSb, InAs, and GaAs, and insulators comprise $SiO_2$ and SiO. It is preferred, however, that the sandwich be formed from a p-type silicon (Si) semiconductor material in conjunction with a layer of silicon dioxide ($SiO_2$). With respect to the layer 14 of additive polarizing material, this material preferably comprises an alkali metal of sodium, lithium or potassium. Alternatively, hydrogen could be employed. In a preferred embodiment of the invention, using a p-type silicon semiconductor and a $SiO_2$ insulator layer, the additive polarizing material was sodium (Na). A more detailed description of the manner of fabricating the memory element sandwich shown generally at 10 will be set forth more fully hereinafter.

Referring again to FIG. 1 of the drawings, the memory element sandwich 10 is connected in a suitable polarizing circuit 20 (to be described more fully hereinafter in connection with FIG. 11) for applying an appropriate polarizing potential to the memory element sandwich during the various write-read operations as will be described more hereinafter.

For convenience of illustration, only the essential parts of the polarizing circuit 20 will be shown in FIGS. 1–5 and 8 which are necessary for effecting the particular condition depicted by any one of these figures. FIG. 1 illustrates the conditions under which no potential stress is applied across the sandwich, and the energy bands of the semiconductor layer 12 and insulator 13 will be as shown in FIG. 1.

The energy bands of semiconductor layer 12 are depicted by the straight lines shown at 32 and 33 where lines 32 represents the bottom of the conduction band and line 33 represents the top of the valence band. Similarly, lines 34 and 35 represent the bottom of the conduction band and the top of the valence band in the insulator material 13. Assuming that the semiconductor material 12 is p-type semiconductor, the Fermi level through the combined semiconductor-insulator is represented by a dashed line 36. In general, some band bending will occur in the semiconductor because of the surface states at the insulator-semiconductor interface 15. However, such bending is considered to be insignificant compared with that caused by the presence of an applied field or stored electric charges in the insulator near the interface 16, and can be ignored. The band structure model shown in FIG. 1 represents that which would occur in any insulator material 13 and any p-type semiconductor material 12. With both metal plates of the memory element sandwich essentially grounded and the energy band state as shown in FIG. 1, the memory element is considered to be in a binary " 0" state which is defined as having no electric charges stored in the insulator layer 13 adjacent the interface 16 (uncharged).

Figure 2:
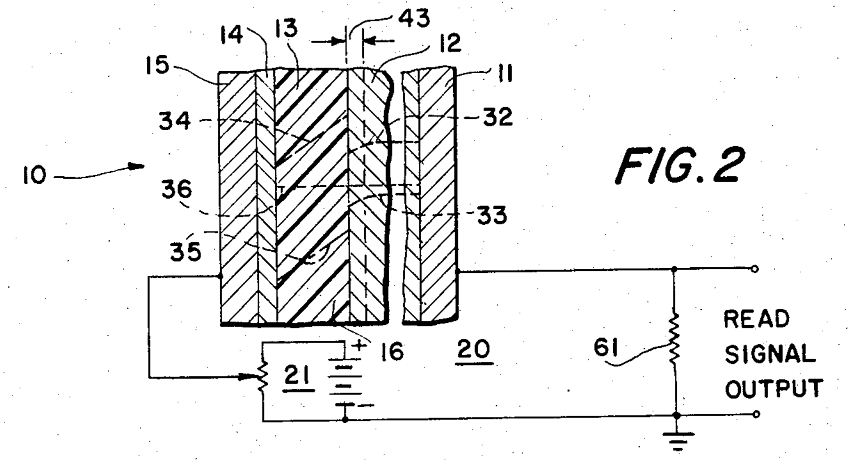
FIG. 2 is a fragmentary schematic illustration of the memory element and associated polarizing circuit illustrating the change in energy band accompanying the application of a polarizing potential to the element.

Upon a positive polarizing voltage being applied across the memory element sandwich in the manner shown in FIG. 2, the sandwich will be stressed positively and the conduction and valence band edges indicated by the lines 34 and 35 will be bent downwardly in the manner shown in FIG. 2. For this purpose, the conductive layer 15 is connected to a circuit branch including a variable potentiometer 21 having its positive terminal connected to the layer 15 for supplying any desired value positive polarity polarizing potential across the sandwich 10 in a manner such that the metalized layer 15 adjacent insulator layer 13 is maintained positive with respect to the metalized layer 11 adjacent the semiconductor layer 12 as shown in FIG. 2. The application of the positive polarizing potential as shown in FIG. 2 may result in the production os a small space charge region shown at 43. For a p-type semiconductor this will be a depletion region. This is due to the fact that some of the voltage drop between the conductive layer 15 and the conductive layer 11 occurs inside the semiconductor 12 near the insulator-semiconductor interface 16, causing bending of the bands 32 and 33 near the interface and resulting in the shallow depletion region 43.

Figure 3:
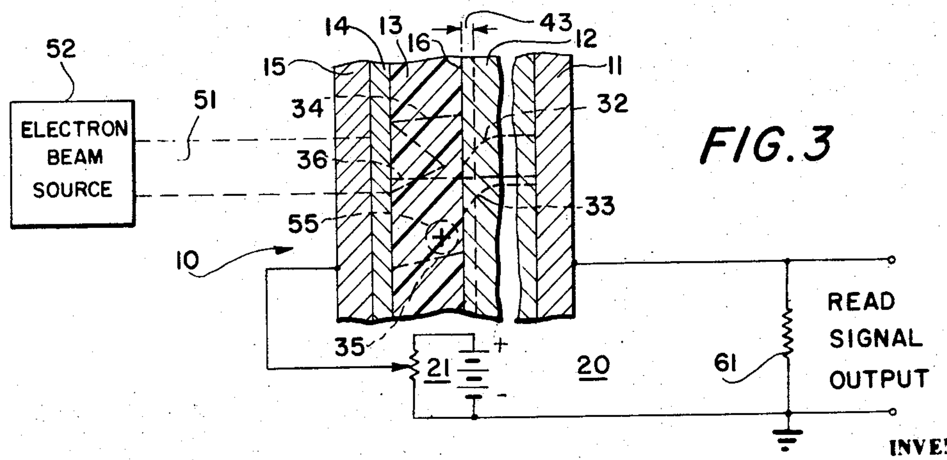
FIG. 3 is a view similar to that of FIG. 2 and illustrates the change that occurs in producing semi-permanent electric charges in the memory element during a writing operation with an electron beam.

FIG. 3 of the drawings depicts the same polarizing circuit conditions for the memory element sandwich 10 as shown in FIG. 2, and in addition, an electron beam indicated at 51 supplied from an electron beam source 52, is directed into the insulator layer 13 after passing through the conductive layer 15 and layer 14 of additive polarizing material.

It is well known that certain insulating films can be permanently polarized by the application of a polarizing voltage across the thickness of the film concurrently with an elevation of the temperature of the film. The polarizing voltage must be applied at the elevated temperature for some minimum period of time. Upon cooling it is found that a stable polarization (electric charge) has been permanently "frozen" into the insulating film, and the frozen-in charge is independent of any applied voltage. Particular examples of this phenomena have been reported in the past using silicon dioxide ($SiO_2$) layers by a number of investigators.

Under the conditions set forth above, the energy of the electron beam 51 is sufficient so that it penetrates through the conductive film 15 and layer 14 of additive polarizing material and into the insulator layer 13. This results in producing stored charges in the insulator 13 in the vicinity of the interface 16. The electron beam excites the electrons in the insulator into the conduction band 34, either from the valence band 35 or from traps in the forbidden region between these two bands, and the resulting excited electrons are swept out from the insulator layer 13 by the electric field across the memory element sandwich. It is assumed that this electron generation within the insulating layer 13 where the electron beam penetrates, is uniform and that most of the insulator layer where the beam penetrates, as well as elsewhere, remains electrically neutral and has uniform conductivity. However, because no electrons flow across the interface 16, a positive space charge will build up in the insulator material 13 adjacent to the interface. It should be noted, however, that any such charge build-up is quite small in comparison to the charge built up by mobile ions of the additive, alkali metal polarizing material as explained hereinafter.

The above described phenomenon is accompanied with a sharp rise in temperature within the selectively located discrete areas of the sandwich 10 upon which the electron beam 51 impinges. This sharp increase in temperature results in the thermal production of mobile ions of the alkali metal additive polarizing material 14.

The thermally produced mobile ions of the additive alkali metal polarizing material 14 are caused to migrate across the insulator layer 13 under the effect of the polarizing electric field applied across the memory element sandwich 10, and accumulate to form an enhanced electric charge 55 adjacent the interface 16. The following expression (1) indicates the time necessary to polarize the insulator layer 13 (ie produce enhanced charge 55) under the assumed conditions, and also provides an indication of the subsequent stability of the enhanced charge upon the temperature returning to a normal ambient value. In general, the time t required to change the polarization of the insulator layer 13 in the above-described manner is given by the expression:

$$t = \tau_o \exp(w/kT) \quad (1)$$

where:

$\tau_o$ = pre exponential factor $\omega$ = activation energy $T$ = temperature $k$ = Boltazman's constant It can be demonstrated that for a value of $\omega$ equal to 1.4 electron volts and $\tau_o = 10^{-13}$, which is typical for a $SiO_2$ insulator layer having a thickness of 1,000 angstrom units and suitably doped with a coating of sodium as the additive polarizing material 14, and for a temperature (T write) to which the insulator layer is selectively raised of approximately 600° Kelvin, that the time for writing is approximately 1 milli-second.

Figure 4:
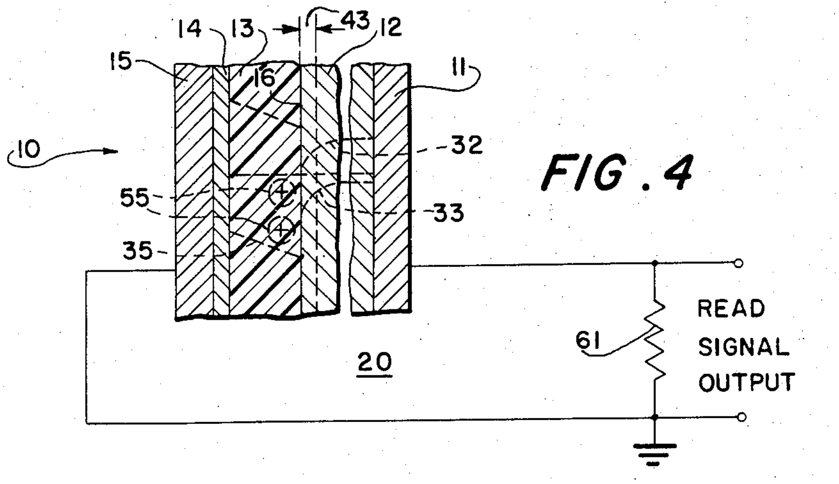
FIG. 4 is a view of the memory element following the writing operation and illustrates the semi-permanent nature of the charges induced in the insulator layer of the element.

Subsequent to writing the enhanced electric charge 55 into selected different discrete locations on the surface of the insulator layer 13, the selected areas are allowed to cool to ambient temperature while maintaining the polarizing potential in the manner shown in FIG. 3 and the charges will be permanently "frozen" into the insulator layer. Thereafter, if the conductive layers 15 and 11 are returned to the same potential and/or grounded as shown in FIG. 4 of the drawings so that no external applied field is imposed across the memory element sandwich 10, the stored enhanced electric charges 55 remain permanently frozen in the insulator layer 13. Similarly, the energy bands in the semiconductor layer 12 and in the insulator 13 remain bent in the vicinity of the interface 16 and the depletion region 43 remains unchanged despite the removal of the externally applied electric field. In otherwords, even though the memory element sandwich is returned to the electrically neutral condition shown in FIG. 1, the stored, enhanced electric charges 55 due to the mobile ions, remain present in the insulator layer 13 and this storage is manifested by the energy band bending and presence of the depletion region 43 in the semiconductor layer as shown in FIG. 4 of the drawings. This state is defined to be the binary "1" storage state in contrast to the binary "0" state shown in FIG. 1.

In the above description, the heating necessary for writing is accomplished by direct conversion of the electron beam energy into thermal energy. An alternate method may be proposed in which the electron beam does not provide thermal energy directly, but rather triggers an auxiliary energy source. The advantage of such a scheme is that a large energy source may thus be tapped so that the electron beam energy may be minimized while still obtaining the local temperature rise. An example of such a scheme would be the utilization of avalanche effects, in which the memory element sandwich is reverse biased to a voltage which is just below the avalanche breakdown potential. When the electron beam strikes a specific area of the sandwich during the writing of "1," the avalanche will be triggered and the area will be locally heated to a temperature sufficient for the above-described writing operation to take place. All other aspects of the write operation are as described above.

A principle feature of the present invention is to make use of the effects of the stored, electric charges 55 on the semiconductor energy bands by detecting the presence of the stored charges (binary "1") as opposed to an uncharged condition (binary "0"). The condition shown in FIG. 4 where the bands in the semiconductor layers are sharply bent at the interface with no externally applied electric field, results in the formation of a depletion region 43 in the semiconductor adjacent the interface 16 (assuming a p-type semiconductor). This provides a built-in electric field within the semiconductor layer adjacent the interface 16 which serves to sweep out in opposite directions electron-hole carriers should they be produced in the depletion region of the semiconductor layer by a reading electron beam probe during a reading operation as will be explained more fully hereinafter in the following paragraphs. It should be noted, however, that the stored charges 55 will remain trapped almost indefinitely in the insulator layer 13, depending upon the temperature and depth of the traps containing the stored charges. It should be further noted that a variety of semiconductor and insulator materials can be used in forming the insulator layer 13 and adjacent semiconductor layer 12 as set forth earlier although p-type Si and $SiO_2$ are preferred.

Figure 5:
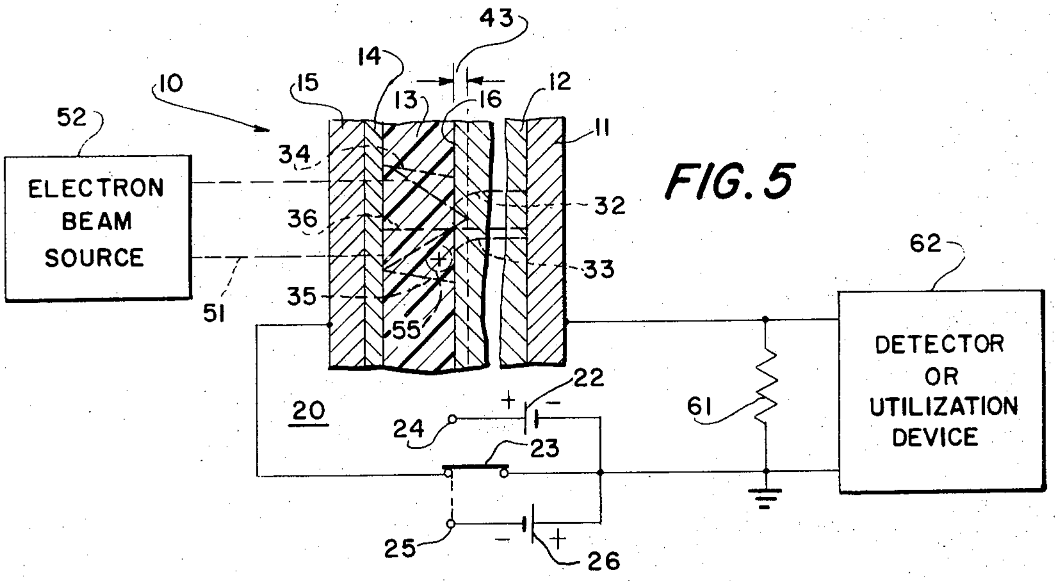
FIG. 5 of the drawings depicts the read-out operation using an electron beam.

FIG. 5 of the drawings illustrates the manner in which data previously stored in the memory element sandwich 10 subsequently is read out and retrieved for use by a computer or other data processing equipment. As illustrated in FIG. 5, during the read-out process, a read-out electron beam 51 is employed having increased penetrating power so that it impinges upon the space charge region 43 of the semiconductor layer 12. Assuming that the semiconductor 12 is a p-type semiconductor material, then the space charge region 43 will be a depletion region. Within this depletion region, electrons excited by the read-out electron beam 51 into the conduction band 32 and the corresponding holes created in the valence band 33 are swept in opposite directions by the built-in electric field in the depletion region 43. This creates an electron-hole carrier current of substantial magnitude which produces an output signal voltage across an output load resistor 61 coupled across the plate 11 and 15 of the memory element sandwich 10. This output signal voltage may then be supplied to a detector or other suitable utilization device 62. As will be explained more fully hereinafter, the electon-hole carrier current produced by impingement of the read-out electron beam within the depletion region 43 will be several orders of magnitude greater than that which would be induced if no space charge region were present in the semiconductor layer as a consequence of stored enhanced electric charges 55 being present in the insulator layer 13 adjacent the interface 16. Read-out generally is accomplished with no bias applied to the memory element sandwich (ie conductive layers 11 and 15 at the same potential). However, in certain instances it may facilitate read-out by supplying a small biasing potential across the memory element sandwich from a battery 22 or other source of positive biasing potential by closing the movable switch contact 23 on fixed contact 24.

In contrast to the above-described situation, where no positive charges 55 have been formed in the insulator layer 13 adjacent interface 16 at a particular discrete location due to a prior recording operation (ie a binary "0" location), then the energy bands within the memory element sandwich 10 will be essentially as shown in FIG. 1, and there would be either a negligible depletion layer or none at all even in the presence of a small biasing read-out potential such as that supplied by battery 22. It is believed evident, that because of the absence of the built-in electric field due to the enhanced depletion layer, the efficiency of the electron-hole carrier collection during the read-out operation from such a non-charged (binary "O") discrete area is quite low in comparison to the electron-hole carrier current collected from a charged discrete location having an enhanced depletion region and representing a binary "1" on the memory sandwich 10.

Figure 6A:
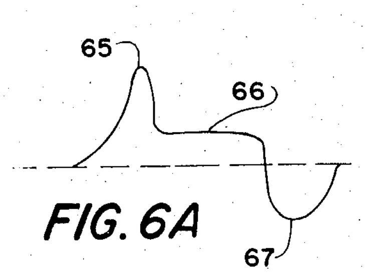
FIGS. 6*a* and 6*b* illustrate the characteristic wave shape of the enhanced electron-hole carrier current pulse and electron-beam-induced current pulse produced during read-out of a memory element employing a p-type semiconductor layer.
Figure 6B:
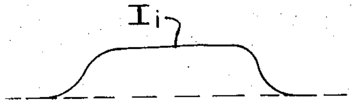

FIGS. 6A and 6B of the drawings illustrate the wave form of the electron-hole current pulses produced across the memory element sandwich 10 from a binary "1" and a binary "0," discrete area, respectively, during a read operation. In FIG. 6A, it will be observed that the collected electron-hole carrier current rises initially to a peak value designated $I_s$ at 64 which can be several orders of magnitude greater than the electron beam-induced current level designated $I_i$ and shown at 66. A small negative peak current shown at 67 occurs as the result of minority carrier recombination at the end of the read-out interval following turn-off of the electron beam probe 51. The peak signal pulse $I_s$ is due to the electron-hole carrier current produced in the depletion region 43 of the semiconductor layer, and can be made to appear in the presence of the stored charges 55 and to disappear with the removal of such charges. It produces an output current flow through the output load resistor 61 which is approximately 80 times. greater in magnitude than the electron beam-induced current $I_i$. Even larger current magnitudes can be obtained depending upon the magnitude of the stored charges 55 in the insulator layer 13 adjacent the interface 16 which in turn determines the extent and magnitude of the depletion region 43.

Figure 7A:
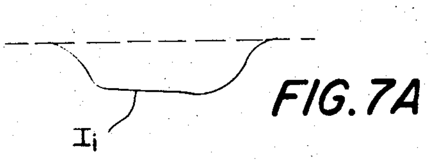
FIGS. 7*a* and 7*b* illustrate the characteristic wave shape of the electron-hole carrier current pulse and electron beam induced current pulse, respectively, produced in reading out a memory element employing a n-type semiconductor layer.
Figure 7B:
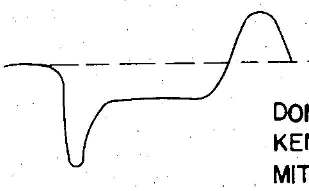

In contrast to the assumed condition that the semiconductor layer 12 is a p-type semiconductor material, if the layer 12 were n-type semiconductor material, then the band bending shown in FIGS. 2–5 would be the same for a positive bias applied during the writing operation and positive charge storage in the insulator layer 13; however, the Fermi level would be located nearer the conduction band 32. With such an arrangement, an accumulation region 43 will be formed rather than a depletion region in the n-type semiconductor layer 12 adjacent the interface 16. Under these conditions, read out is accomplished while applying a negative read out polarizing potential to the memory element sandwich 10. This can be accomplished with the arrangement shown in FIG. 5 by switching contact 23 to its dotted line position where it is closed on fixed contact 25. As a result, a negative biasing potential is supplied from source 64 through contact 19 to the conductive layer 15 while grounding the conductive layer 11 through load resistor 61. Since an electron-hole carrier current can be induced only in the presence of a depletion region, the negative bias from source 64 must be sufficient to convert the region 43 to a depletion region. During read-out with the increased penetrating power, read-out, electron beam 51, the presence of enchanced charges 55 in the binary "1" discrete locations on the memory element sandwich 10, result in the production of only a relatively small electron beam induced, negative current pulse $I_i$ as shown in FIG. 7A of the drawings. In locations where a binary "0" has been recorded due to the absence of the electric charges 55, large electron-hole carrier current signal pulses $I_s$ will be produced as shown in FIG. 7B of the drawings. Both binary "1" and "0" signal pulses resulting from a memory element sandwich 10 employing an n-type semiconductor material and negative polarity read-out polarizing potential, are negative in polarity as shown in FIGS. 7A and 7B.

In order to update the data or information recorded in the memory element sandwich 10, it may be necessary to convert the positive electric charges representing a binary "1" previously stored in any given different discrete location to an uncharged condition representing a binary "0."

Figures 8, 9:
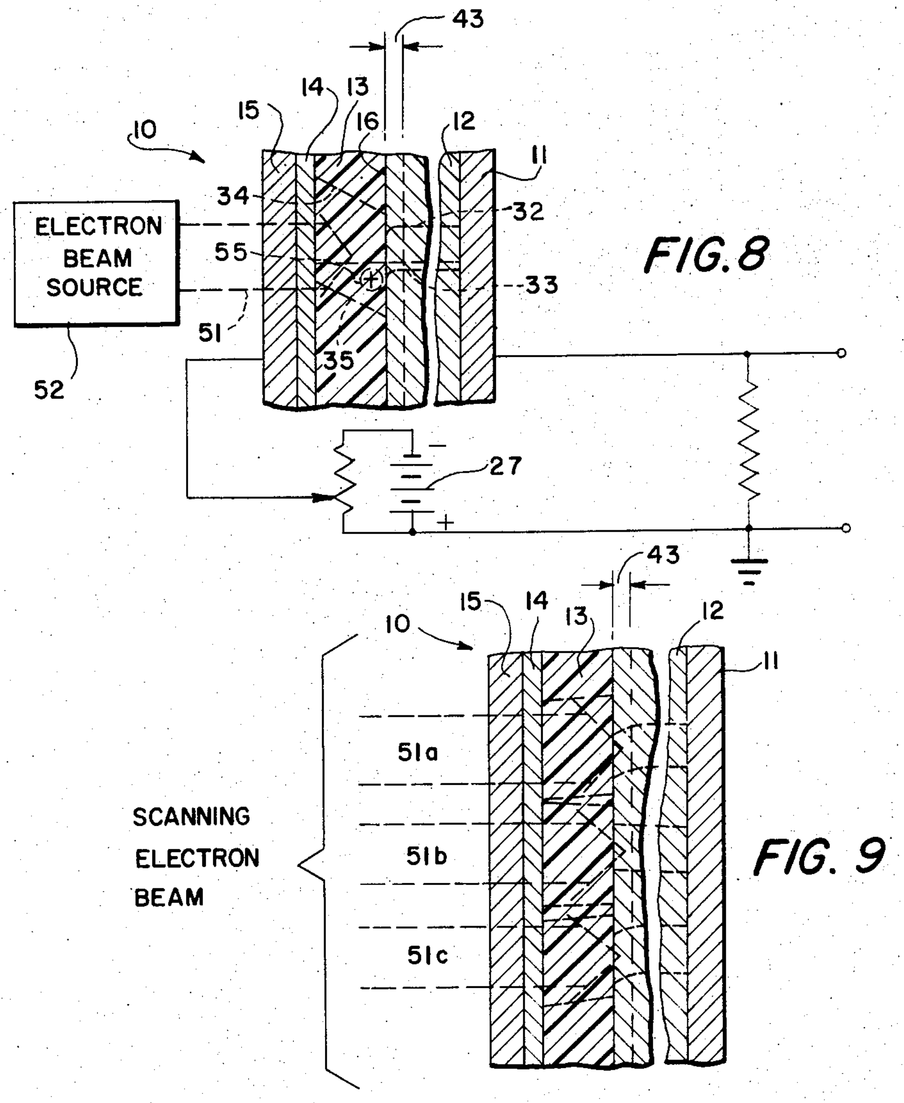
FIG. 8 illustrates the polarizing circuit arrangement required to erase previously formed charges in the memory element.
FIG. 9 is an enlarged partial view of a memory element showing a series of three discrete locations on the element, two of which are charged and one of which is uncharged, as would occur in recording binary information where the presence of electric charges corresponds to a binary "1" and the absence of electric charge corresponds to a binary "0."

FIG. 8 of the drawings illustrates the manner in which rewriting a binary "1" into a "0" is accomplished in accordance with the invention. In FIG. 8, the conductive layer 15 is connected to a large negative polarity writing polarizing potential source 27 which may comprise a variable battery or any other suitable source of direct current potential in the range of about 10–50 volts DC. The insulator layer 13 is then bombarded with the writing electron beam 51 in the particular discrete locations where it is desired to erase the stored electric charges 55, and selectively heats the insulator layer in these locations to an increased temperature in the neighborhood of 600° Kelvin. Under these conditions, the mobile alkali metal ions are caused to migrate back out to the negatively biased conductive layer 15 and coating 14 interface with insulator 13 and away from the interface 16. Thereafter upon subsequent cooling of the insulator layer 13 to ambient temperature while maintaining the negative bias on conductive layer 15, the energy bands of the memory element sandwich 10 in the particular discrete locations in question, will be returned to the conditions shown in FIG. 1 of the drawings. In this manner a discrete area is rewritten from a binary "1" charged condition into a binary "0" uncharged condition. The time period required for such rewriting is comparable to that required to record a "1" originally, and is on the order of one (1) millisecond.

From the above description, it will be appreciated that the memory element sandwich 10 serves to store enhanced electric charges in certain selected discrete areas with the remaining areas being uncharged. The discrete charged areas can represent a binary bit of information with the uncharged areas of the sandwich representing a different binary bit of information. The bit of information represented by the stored enhanced electric charge and uncharged locations occupy an area of the sandwich about the same size as the cross-section of the electron beam which is used to form the charged areas. The stored information thus recorded can be readily detected and read-out by measuring the response of the memory element sandwich to a scanning, read-out electron beam probe adjusted to impinge upon the space charge region of the adjacent semiconductor layer. If an enhanced charge previously has been stored at the spot interrogated by the read-out electron beam, either an enhanced electron-hole carrier current pulse $I_s$ or a reduced electron beam induced, oxide conductivity current pulse $I_i$ will be produced during read-out. Hence, retrieval of binary "1" or binary "0" bits of information readily can be accomplished. Ideally, the read-out electron beam energy should be higher in energy (about 10–20 kev) and the cross-section of the beam should be somewhat smaller, than the energy and cross-section of the writing electron beam. Preferably, the read-out electron beam has a lower current density however, if desired for improved read-out sensitivity, the current density can be the same for both the writing beam and the read-out beam in view of the relatively non-destructive, nature of positive electric charges produced by the alkali metal additive polarizing material mobile ions present in the insulating layer.

The stored, enhanced electric charges due to the movile ions migrating to the interface are so much greater than any charges that might be produced in a previously uncharged area of the insulator layer 13 during read-out, that no substantial danger of undesired or inadvertent erasure of previously recorded information can be said to exist. This is due primarily to the fact that the read out current can be several orders of magnitude less than that required for writing. Thus, inadvertent charging of binary "0" areas of the memory element sandwich during read-out will be of such low order, in contrast to the charging at the higher instensities during writing, that it can be considered negligible. Accordingly, read-out of the memory element sandwich in accordance with the present invention can be said to be essentially non-destructive in nature. As a consequence, such corrective measures as re-writing each bit of information following read-out (which necessarily limit access time to the memory) are unnecessary. Consequently, access time to information recorded on the improved memory element sandwich described is reduced to a minimum, and is determined primarily by the characteristics of the scanning electron beam source 52 used for read-out and switching times of the polarizing circuits. In this regard, it might be noted that while in the instant disclosure mechanical switches are depicted, in any practical memory system employing the invention, high speed electronic digital logic circuits would be employed to accomplish switching so as to reduce access times to the memory to a minimum.

If a memory element sandwich 10 which is about 8mm × 8mm square, is employed as an information storage retrieval medium in accordance with the above description, the binary bit information storage will be accomplished over a vast number of information storage points (about $64 \times 10^6$ bits) with a memory element sandwich of this size. FIG. 9 of the drawings is a cross-sectional view of a part of such a memory element sandwich showing three binary bits of information representing the binary number 101 stored in accordance with the present invention. Assuming that a scanning read-out electron beam is sequentially scanned across the memory element sandwich in a manner such that it is directed from the position 51 to the position 51b, and thence to the position 51c while dwelling in each of these discrete positions for an interval of time sufficient to induce the desired electron-hole carrier read-out current signal pulses. This dwell time is approximately $10^{-6}$ seconds or less and is compatible with minimum access times for retrieval of information.

Figure 10A:
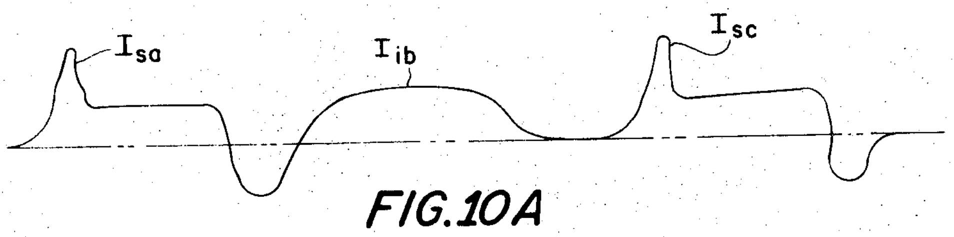
Figure 10B:
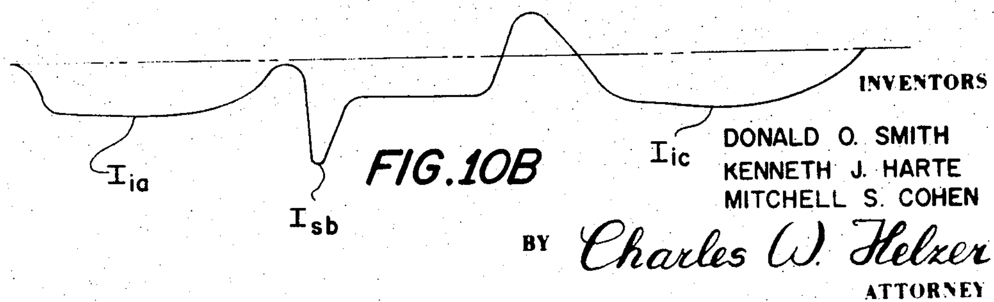

Assuming that the semiconductor layer 12 is fabricated from a p-type semiconductor such as silicon and the insulator layer 12 is fabricated from $SiO_2$ having an additive polarizing material layer 14 of sodium coated, evaporated, sprayed, dipped, or otherwise formed thereon prior to the formation of the conductive layer 15, then the resulting signal pulses detected from the sandwich would be as shown in FIG. 10*a* of the drawings. From an examination of FIG. 10*a* it is seen that the resulting output signal would have a positive current signal pulse $I_{sa}$ corresponding to the read-out electron beam position 51*a*, an electron beam induced oxide-conductivity current only $I_{ib}$ corresponding to the readout electron beam position 51*b*, and an enhanced electron-hole carrier current signal pulse $I_{sc}$ corresponding to the read-out electron beam position 51*c*. Thus, it will be appreciated that monitoring the current pulses $I_{sa}$, the absence of a pulse at a point in time corresponding to the positioning of the read-out electron beam probe at point 51*b*, and the presence of the enhanced electron-hole carrier current pulse $I_{sc}$, results in the production of an output pulse modulated signal corresponding to the stored binary information 101. FIG. 10*b* of the drawing illustrates the resulting output signal wave form that would be produced if the semiconductor layer 12 in FIG. 9 was fabricated from a n-type semiconductor and employed a negative read-out polarizing bias potential.

A preferred embodiment of the invention would utilize a memory element sandwich 10 formed from a semiconductor layer 12 of silicon, a $SiO_2$ insulator layer 13 and a coating of additive polarizing material 14 of Na. This device would be made starting with a chip of single crystal p-type silicon 12 having an resistivity of approximately 1.0 ohm-centimeters and about 100 dislocations per $cms^2$ with the chip being about 0.2mm in thickness and 2.5 cms in diameter. The chip is provided with a mirror finish on the (100) face, and then is placed in a quartz holder and cleaned and etched in hydrochloric acid, buffered with ammonium fluoride, and then cleaned and etched again with hydrochloric acid. The chip is then heated to about 1,100° C. in the presence of dry oxygen to produce the layer 13 of $SiO_2$ on the surfaces of the chip about 1,000 angstroms thick. Following these operations the chip is dipped in a rinse of a dilute solution of NaCl to form only a very thin coating 14 of a few angstroms thickness of the sodium additive polarizing material on the surfaces of the $SiO_2$. Alternatively, the oxide could be doped during growth with the alkali metal polarizing material. One surface of the chip is then ground and cleaned followed by suitable etching, buffering and cleaning steps to prepare it for metalization. The chip may then be broken into square elements about 8mm on a side, and aluminum layers 11 and 15 of about 500 angstroms thickness vacuum deposited over each of the exposed surfaces. Gold lands may be deposited on the aluminum layers 11 and 15 to assure good electrical contact for leads to the polarizing circuitry. Alternatively, in place of the aluminum conductive layer 11, an ohmic contact may be formed on this base of the semiconductor to provide for connection to the polarizing circuitry.

Figure 11:
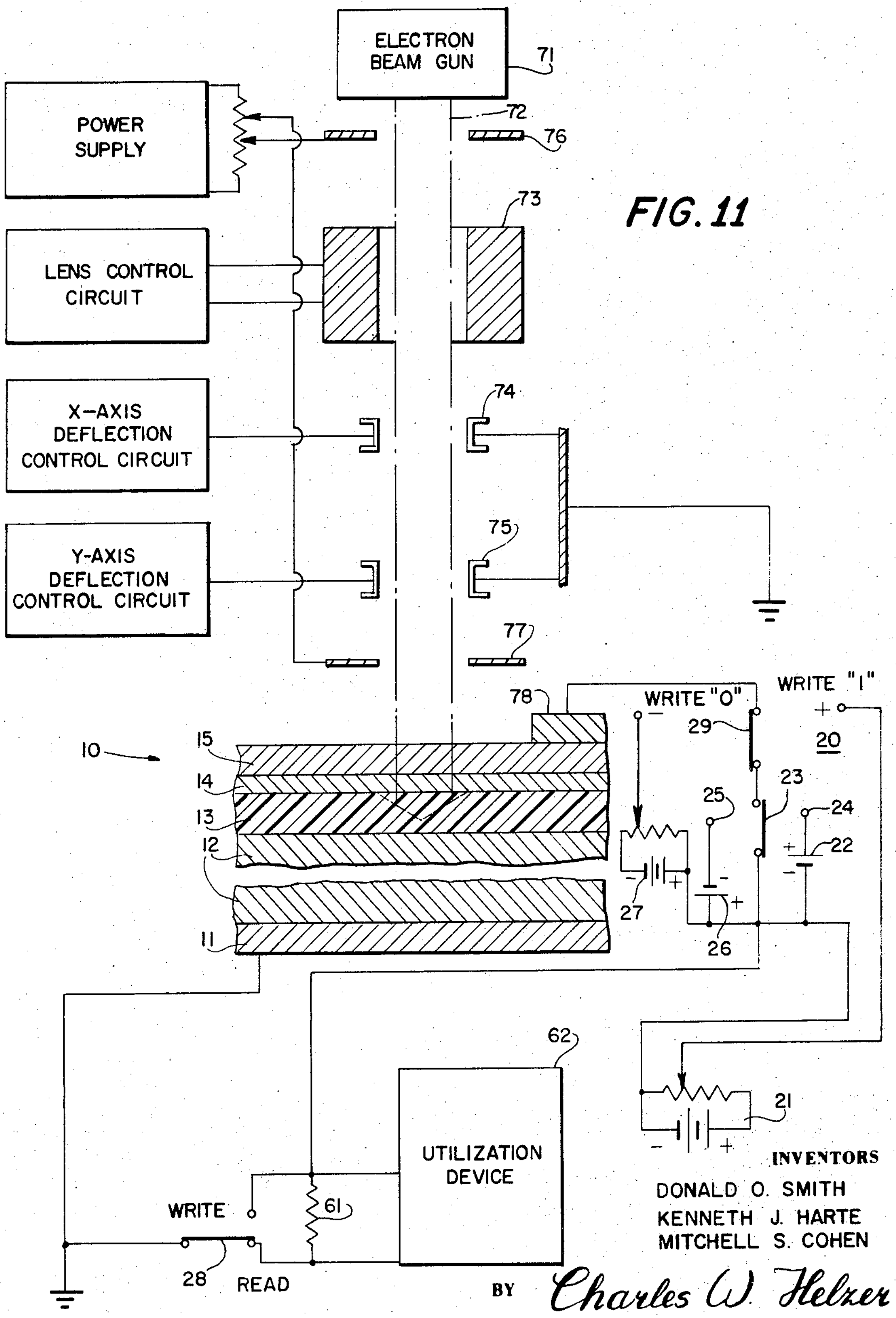
FIG. 11 is a more detailed schematic diagram illustrating an overall memory system employing a scanning electron beam apparatus together with a memory element and appropriate polarizing circuit constructed in accordance with the invention.

FIG. 11 of the drawings is a schematic illustration of the memory method, system and element constructed in accordance with the invention and utilizing a memory element sandwich 10 fabricated in the above-described manner. The system employs a scanning electron beam apparatus having an electron beam gun 71 for producing either a write (record) electron beam having an energy of about 5 $K_ev$ and a beam current density of about $2.5 \times 10^{-3}$ amp/$cm^2$ or, alternatively, a read-out electron beam of about 10–20 Kev and 5 ×

$10^{-6}$ amp/cm$^2$. The electron beam 72 is focused to a 1–5 micron diameter spot size by a suitable focussing lens arrangement 73, followed by X axis and Y axis deflection lenses 74 and 75, respectively, for directing the electron beam 72 to the various discrete points on the memory element sandwich 10. Apertures 76 and 77 limit the area of the memory element sandwich 10 which can be subjected to the electron beam, however, it is to be understood that the entire effective storage area of the memory element across its 8 mm by 8 mm face is exposed to the action of the write-read electron beam 72. Suitable polarizing voltages for the write/read operations are provided from the polarizing control circuitry 20 described partially in connection with FIGS. 1–5 and 8. The polarizing control circuitry 20 further includes selector switches 28 and 29 for controlling input connections to and output connections from the memory element sandwich 10. As stated previously, while these elements are depicted as simple, mechanical on-off switches, battery sources, and the like, in any practical embodiment of the invention the polarizing control circuitry would utilize computer controlled high speed logic circuits and similar components to accomplish the switching and biasing operations herein described. Thus, the switch 28 is intended to depict a high speed strobing control switch for decoupling load resistor 61 and utilization device 62 such as a computer from the memory element sandwich during write cycles. Similarly, the switch 29 depicts a control element for controlling polarization of the memory element sandwich to effect the writing of a "1" or a "0" or to effect a reading operation under the different conditions previously described. In the memory element shown in FIG. 11, a gold land 78 is provided for connecting electric leads from the polarizing circuitry 20 to the conductive layer 15. The utilization device 62 may be a recorder such as an osciloscope, or a utilization device such as a computer system employing the memory element sandwich 10 as either its main or peripheral memory.

The memory element sandwich 10 and related electron beam apparatus 71 and polarizing circuitry 20, can be operated as the main or central memory of a computer system in the following manner: With a positive writing polarizing potential applied to the conductive layer 15 from positive polarizing potentiometer 21, enhanced positive electric charges will be stored in selected different discrete areas of the insulator layer 13 during bombardment with the writing electron beam 72. The writing electron beam 72 at this point has sufficient energy to penetrate only the conductive layer 15 and a coating 14 and to impinge into the insulator layer 13 causing it to heat the insulating layer to a temperature sufficient to form mobile ions of sodium that migrate within the insulating layer to a location closely adjacent the interface 16. This results in producing an enhanced space charge region (depletion region) at the point in question thereby recording a binary "1." At points or discrete locations where it is desired that a binary "0" appear, the electron beam 72 is not allowed to impinge. The position of the bit of information recorded on the memory element sandwich 10 is thus defined by the position of hte writing beam 72. If it is desired to erase a binary "1" bit that previously has been recorded at a particular discrete location, thereby automatically writing a binary "0" at the point, the polarity of the bias potential is changed to a negative polarity by switching the switch contact 29 onto the negative polarity biasing potentiometer 27. Under these conditions, a previously charged location of the insulator layer will have the charge erased thereby returning it to a binary "0" condition. Thus, the state of a particular bit formed on the memory element sandwich 10 is defined by the polarity of the polarizing potential applied to the sandwich during writing at that particular point. Thus, as one writes across the surface of the sandwich for each different discrete location where a bit is to be recorded, the polarizing circuitry 20 will be switched to provide a proper polarity polarizing potential to the sandwich during the writing operation at this particular location.

Subsequent to the recording operation described above, the stored information at any given discrete location can be interrogated by the read out electron beam 72 which has its penetrating power increased to about 10–20 Kev and preferably is focused to a slightly smaller diameter spot than that employed during the recording operation. The beam current density is also reduced in order to avoid heating of the bit during interrogation. A suitable bias is applied to the memory element sandwich which may be zero value or positive for p-type semiconductor materials, and negative in value for n-type semiconductor materials. The resulting electron-hole carrier signal pulses produced across the load resistor 61 are then detected and used by the utilization device 62. In the case of a p-type semiconductor material, the output signal will exhibit a large positive current pulse $I_s$ if a binary "1" has been stored and a comparatively small positive pulse $I_t$ if a binary zero has been stored. Where an n-type semiconductor material has been employed, the resulting output signal will exhibit a small negative going current pulse $-I_t$ which is representative of a binary "1" and a larger negative going current pulse $-I_s$ for a binary "0." The read-out electron beam current density and value of polarizing potential can be adjusted during read-out to provide a desired sensitivity and access time.

It should be noted that in accessing to any give discrete location on the surface of the memory element sandwich 10, suitable, discrete value excitation signals will be supplied to the X axis and Y axis deflection lens assemblies 74 and 75, respectively. The discrete values of these excitation signals will in effect determine the discrete location on the memory element sandwich 10 where a particular bit of information is recorded. During the reading operation, in order to read out that particular bit of information, all that is required is to reproduce the particular value excitation signals supplied to the X axis and Y axis deflection lens assemblies 74 and 75. Thus, recording and read out is facilitated. It is not required that specially tailored excitation signals be employed in order to access the electron beam to a particularly defined, coordinate position on the surface of the memory element sandwich. This characteristic, greatly facilitates the design and operation of the system as a high speed computer memory.

From the foregoing description, it will be appreciated that the invention provides a new and improved relatively slow write-fast read out memory method, system and element for information storage and retrieval. The improved memory, method and system employs an electrically chargeable, polarizing material enriched insulator-semiconductor memory element sandwich for permanently recording data in the form of selectively placed, different discrete electric charges which subsequently can be read out non-destructively at high speeds with a scanning electron beam read out apparatus. The method, system and memory element while requiring relatively long recording times on the order of one millisecond, makes available high speed, random access, non-destructive read out retrieval times on the order of a few microseconds, and is ideally suited for use as a high speed computer system memory which requires updating only occasionally but is to be read-out regularly at high speeds with minimum access time.

Having described several embodiments of an updatable write-fast read out memory method, system and element, constructed in accordance with the invention, it is believed obvious that other modifications and variations of the invention are possible in light of the above teachings. It is therefore to be understood that changes may be made in the particular embodiments of the invention described which are within the full intended scope of the invention as defined by the appended claims.

What is claimed is:

1. An updatable write/erase-information storage method for subsequent fast read-out in conjunction with computers and the like and employing a memory element comprising a conductive back layer, a semiconductor layer, an insulator enriched with an additive polarizing material and a conductive front layer arranged in the order named in the form of a sandwich with the semiconductor layer and polarizing material enriched insulator layer forming an interface, the method comprising selectively heating discrete different locations on the memory element in accordance with intelligence to be recorded, applying a polarizing writing potential across the memory element concurrently with the selective heating which polarizes the insulator layer positive with respect to the semiconductor layer to thereby form positive electric charges due to mobile ions of the additive polarizing material in the insulator layer adjacent the interface and results in enhanced space charge regions being formed in the semiconductor layer adjacent the interface at the selectively heated different discrete locations, and subsequently cooling the selectively heated different discrete locations to ambient temperature while maintaining the polarizing potential to thereby freeze in the selectively located positive electric charges in the insulator layer and resulting selectively located enhanced space charge regions in the semiconductor layer to thereby permanently record the intelligence.

2. An updatable write/erase information storage method according to claim 1 further including switching the polarizing potential across the memory element to a different polarity and/or value de-polarizing potential and concurrently selectively heating the discrete different locations on the memory element and subsequently cooling the selectively heated discrete different locations to ambient temperature while maintaining the de-polarizing potential to thereby erase the positive electric charges previously formed in the insulator layer in a recording step.

3. An updatable write/erase information storage method according to claim 2 wherein the selective heating is accomplished with a finely focused scanning electron beam impinging on discrete different locaions of the memory element for discrete write/erase time intervals where it is desired selectively to write or erase.

4. An updatable write/erase information storage method according to claim 3 wherein the insulating layer of the memory element is selected from the class of materials including $SiO_2$ and SiO, and the polarizing material is an alkali metal.

5. An updatable write/erase information storage method according to claim 4 wherein the alkali metal polarizing material is from the group consisting of sodium and lithium.

6. An updatable write/erase-fast read only information storage and retrieval method according to claim 3 further including increasing the penetrating power of the scanning electron beam to cause it to penetrate through the insulator layer and interface to the adjacent space charge region of the semiconductor layer to thereby produce electron-hole carriers in the region, simultaneously sweeping out the electron-hole carriers to produce output signal pulses, and detecting the resulting electron-hole carrier output signal pulses from the different discrete locations on the memory element as they are probed by the scanning electron beam.

7. An updatable write/erase-fast read only information storage and retrieval method according to claim 6 wherein the insulating layer of the memory element is selected from the class of materials consisting of $SiO_2$ and SiO and the polarizing material is an alkali metal.

8. An updatable write/erase-fast read only information storage and retrieval method according to claim 7 wherein the alkali metal polarizing material from the group consisting of sodium and lithium.

9. An updatable write/erase-fast read only information storage and retrieval method according to claim 8 wherein the semiconductor layer is a p-type semiconductor and the enhanced space charge regions comprise depletion regions, and enhanced positive polarity electron-hole current pulses are produced at those different discrete enhanced depletion region locations on the memory element where enhanced electric charges selectively were formed in the insulator in accordance with the intelligence recorded during the writing operation.

10. An updatable write/erase-fast read only information storage and retrieval method according to claim 8 wherein the semiconductor layer is an n-type semiconductor and the enhanced space charge regions comprise accumulation regions, a polarizing reading potential which is negative in polarity is applied across the sandwich whereby the insulator layer is negative relative to the semiconductor layer, and reduced negative polarity electron-hole current pulses are produced at those different discrete enhanced accumulation region locations on the memory element where enhanced electric charges selectively were formed in the insulator during the writing operation.

11. An updatable write/erase information storage apparatus comprising a memory element having a conductive back layer, a semiconductor layer, an insulator enriched with an additive polarizing material and a conductive front layer arranged in the order named in the form of a sandwich with the semiconductor layer and polarizing material enriched insulator layer forming an interface, selective heating means for selectively heating discrete different locations on the memory element in accordance with intelligence to be recorded, write biasing means for applying a polarizing writing potential across the memory element concurrently with the selective heating and which polarizes the insulator layer positive with respect to the semiconductor layer to thereby form positive electric charges due to mobile ions of the additive polarizing material in the insulator layer adjacent the interface and results in enhanced space charge regions being formed in the semiconductor layer adjacent the interface at the selectively heated different discrete locations, and means for subsequently cooling the selectively heated different discrete locations to ambient temperature while maintaining the polarizing writing potential to freeze in the selectively located positive electric charges in the insulator layer and resulting selectively located enhanced space charge regions in the semiconductor layer to thereby permanently record the intelligence.

12. An updatable write/erase information storage apparatus according to claim 11 further including switching means for switching the polarizing potential across the memory element to a different polarity and/or value de-polarizing potential, means for selectively heating the discrete different locations to be erased on the memory element concurrently with the application of the de-polarizing potential, and means for subsequently cooling the selectively heated discrete different locations to ambient temperature while maintaining the de-polarizing potential to thereby erase the positive electric charges previously formed in the insulator layer in a recording step.

13. An updatable write/erase information storage apparatus according to claim 12 wherein the selective heating means comprises a scanning electron beam writing device for producing a finely focused scanning electron beam that is caused to impinge on discrete different locations of the memory element for discrete write/erase time intervals where it is desired selectively to write or erase.

14. An updatable write/erase information storage apparatus according to claim 13 wherein the insulating layer of the memory element is selected from the class of materials consisting of $SiO_2$ and SiO and the polarizing material is an alkali metal.

15. An updatable write/erase information storage apparatus according to claim 14 wherein the alkali metal polarizing material is from the group consisting of sodium and lithium.

16. An updatable write/erase-fast read only information storage and retrieval apparatus according to claim 13 further including means for increasing the penetrating power of the scanning electron beam produced by the scanning electron beam writing apparatus to cause it to penetrate through the insulator layer and interface to the adjacent space charge region of the semiconductor layer to thereby produce electron-hole carriers in the region, means for sweeping out the electron-hole carriers to produce output current pulses, and means for detecting the resulting output electron-hole carrier current pulses, and means for detecting the resulting output electron-hole carrier current pulses from the different discrete locations on the memory element as they are probed by the scanning electron beam.

17. An updatable write/erase-fast read only information storage and retrieval apparatus according to claim 16 wherein the insulating layer of the memory element is selected from the class of materials consisting of $SiO_2$ and SiO and the polarizing material is an alkali metal.

18. An updatable write/erase-fast read only information storage and retrieval apparatus according to claim 17 wherein the alkali metal polarizing material is from the group consisting of sodium and lithium.

19. An updatable write/erase-fast read only information storage and retrieval apparatus according to claim 18 wherein the semiconductor layer is a p-type semiconductor and the positive space charge regions comprise depletion regions and enhanced positive polarity electron-hole current pulses are produced at those different discrete enhanced depletion region locations on the memory element where positive electric charges selectively were formed in the insulator in accordance with the intelligence recorded during the writing operation.

20. An updatable write/erase-fast read only information storage and retrieval apparatus according to claim 18 wherein the semiconductor layer is an n-type semiconductor and the enhanced space charge regions comprise accumulation regions, a polarizing reading potential which is negative in polarity is applied across the sandwich whereby the insulator layer is negative relative to the semiconductor layer, and reduced negative polarity electron-hole current pulses are produced at those different discrete enhanced accumulation region locations on the memory element where positive electric charges selectively were formed in the insulator during the writing operation.

21. A memory element for an updatable write/erase-fast read only information storage and retrieval system wherein data is stored in the form of electric charge patterns formed on the memory element, said memory element comprising, a conductive back layer, a semiconductor layer, an insulator layer enriched with an additive polarizing material and, a conductive front layer arranged in the order named in the form of a sandwich with the semiconductor layer and polarizing material enriched insulator layer forming an interface, whereby electric charges permanently stored in the insulating layer adjacent the interface produce an enhanced space charge region in the semiconductor layer adjacent the interface.

22. A memory element according to claim 21 wherein, the conducitve front and back layers cover substantially the entire surface of the semiconductor and insulator layers opposite the surfaces thereof forming the insulator-semiconductor interface.

23. A memory element according to claim 22 further including, terminal lead means for respective electrical connection of a source of electric energy across the conductive back layer and the conductive front layer, thereby producing an electric field across substantially the entire cross section of the sandwich.

24. A memory element according to claim 23 wherein, the conductive front layer and polarizing material enriched insulating layer have a combined thickness of about 1500 angstrom units (1500 A°) with the thin coating of additive polarizing material disposed therebetween and the combined layers can be penetrated by an electron beam of moderate energy level.

25. A memory element according to claim 24 wherein localized heating due to selective impingement of an electron beam into given areas of the polarizing material enriched insulator layer in the presence of a positive polarity polarizing electric field across the sandwich which biases the insulator layer positive with respect to the semiconductor layer produces positive mobile ions from the additive polarizing material which migrate to the interface and produce greatly enhanced stored positive electric charges upon subsequent cooling of the localized heated areas in the presence of the polarizing electric field and results in the production of localized enhanced space charge regions in the semiconductor layer adjacent the interface.

26. A memory element according to claim 25 wherein subsequent impingement of a reading electron beam into the enhanced space charge regions of the semiconductor layer produces electron-hole carriers which are separated and swept from the region by a built-in electric field in the semiconductor layer and results in the production of current pulses which are representative of the intelligence contained in the stored electric charge patterns.

27. A memory element according to claim 25 wherein the insulating layer is selected from the class of materials consisting of $SiO_2$ and SiO and the additive polarizing material is an alkali metal.

28. A memory element according to claim 27 wherein the alkali metal additive polarizing material is from the group consisting of sodium and lithium.

29. A memory element according to claim 28 wherein subsequent impingement of a reading electron beam into the enhanced space charge regions of the semiconductor layer produces electron-hole carriers which are separted and swept from the region by a built-in electric field in the semiconductor layer and results in the production of current pulses which are representative of the intelligence contained in the stored electric charge patterns.

30. A memory element according to claim 29 wherein the semiconductor layer is a p-type semiconductor and the enhanced space charge regions comprise depletion regions, and results in the production of positive polarity electron-hole output current pulses at the different discrete enhanced depletion regions on the memory where positive electric charges selectively were formed in the insulator in accordance with the intelligence recorded on the memory element.

31 A memory element according to claim 29 wherein the semiconductor layer is a n-type semiconductor and the enhanced space charge regions comprise accumulation regions, a polarizing reading potential which is negative in polarity is applied across the sandwich whereby the insulator layer is negative relative to the semiconductor layer, and reduced negative polarity electron-hole output current pulses are produced at those different discrete enhanced accumulation region locations on the memory element where enhanced electric charges selectively were formed in the insulator in accordance with the intelligence recorded on the memory element.

* * * * *